United States Patent [19]

Williams

[11] 4,339,234

[45] Jul. 13, 1982

[54] DRIVE CAM AND FOLLOWER FOR A LIQUID FUEL INJECTION PUMPING APPARATUS

[75] Inventor: Derek Williams, Hertford, England

[73] Assignee: Lucas Industries Limited, Birmingham, England

[21] Appl. No.: 165,673

[22] Filed: Jul. 3, 1980

[30] Foreign Application Priority Data

Aug. 3, 1979 [GB] United Kingdom ................ 7927122

[51] Int. Cl.³ ...................... F04B 39/00; F16H 25/14

[52] U.S. Cl. ...................................... 417/490; 74/55; 74/567

[58] Field of Search .......................... 74/55, 567, 569; 123/49.48, 495, 503; 417/490, 499

[56] References Cited

U.S. PATENT DOCUMENTS

| | | | |
|---|---|---|---|
| 2,735,313 | 2/1956 | Dickson | 74/569 |
| 3,108,580 | 10/1963 | Crane | 74/55 X |
| 3,139,076 | 6/1964 | Flaherty | 74/55 X |
| 3,668,945 | 6/1972 | Hofmann | 74/569 |
| 3,822,683 | 7/1974 | Clouse | 74/569 X |

FOREIGN PATENT DOCUMENTS

| | | | |
|---|---|---|---|
| 619146 | 3/1949 | United Kingdom | 123/495 |
| 1244471 | 9/1971 | United Kingdom | 74/55 |

*Primary Examiner*—Leonard E. Smith

[57] ABSTRACT

A liquid fuel injection pumping apparatus comprises a reciprocable pump plunger operable by a tappet assembly and a rotary cam. The tappet assembly includes a cylindrical body slidable within a bore, the body carrying a cross pin which supports a roller engageable with the cam. The cross pin has reclined ends so that if it moves axially while exposed beyond the end of the bore it will engage the bore and move axially to its correct position. With cams designed to give maximum plunger movement the pin is exposed for an appreciable time and heavy wear of the pin and bore can occur. The cam is therefore designed to allow outward movement of the plunger but then to hold the plunger until just before inward movement of the plunger is required to take place. While the plunger is held the filling port of the pump is at least partly uncovered. The cam has a trailing flank which comprises a first part during which the plunger can move outwardly, a second part during which the plunger is held against outward movement and a third part which allows the full outward movement.

2 Claims, 1 Drawing Figure

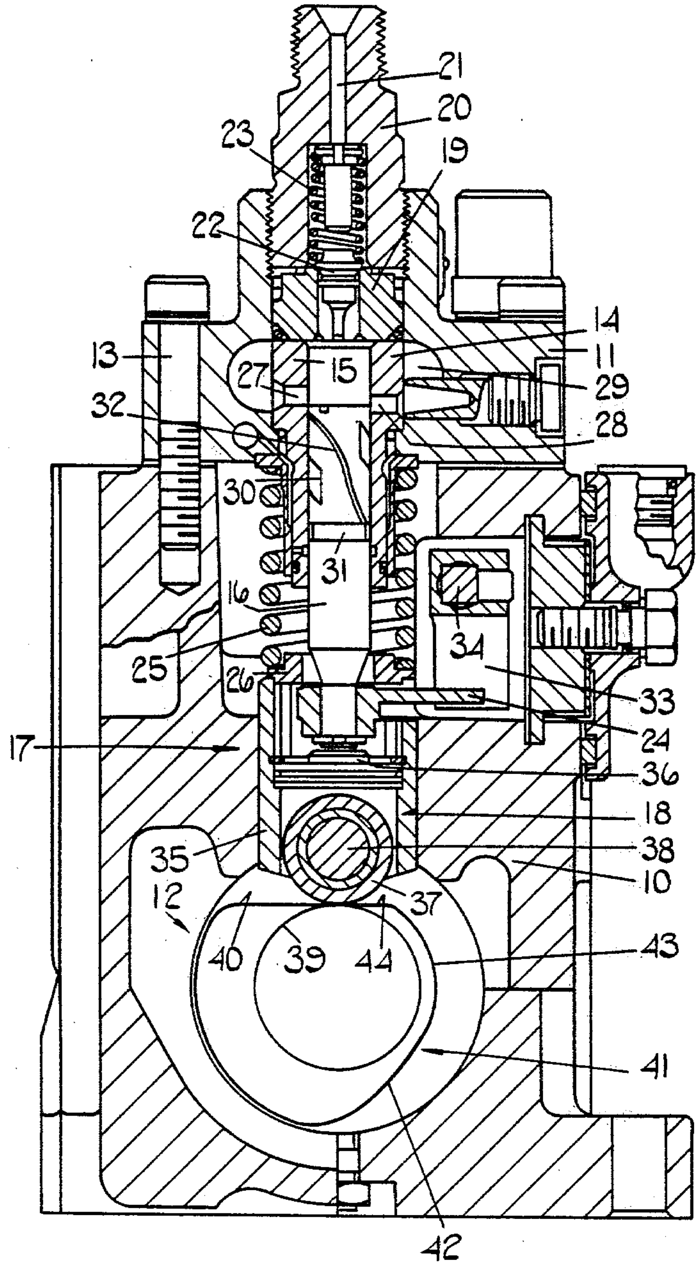
21
20
23
19
22
14
13
11
27
15
29
32
28
30
31
16
34
25
33
26
24
17
36
18
35
38
10
12
37
43
40
39
44
41
42

DRIVE CAM AND FOLLOWER FOR A LIQUID FUEL INJECTION PUMPING APPARATUS

This invention relates to liquid fuel injection pumping apparatus of the kind comprising a body part, a pump barrel located within the body part, a bore formed in the barrel, a reciprocable pump plunger located in the bore and extending from one end thereof, an outlet from the other end of the bore, a port formed in the wall of the bore and which is uncovered by the inner end of the plunger as the latter moves outwardly to allow fuel to flow into the bore, resilient means biassing the plunger outwardly, a tappet operatively connected to the plunger and supported within a bore defined in the body part, said tappet comprising a hollow body, a roller supported in the hollow by a cross pin, and a rotary cam positioned for engagement with the roller, said cam being shaped to impart inward movement to the tappet and plunger.

Such apparatus is well known in the art and it is the practice to provide the cross pin with radiussed ends so that if the pin moves axially when in a position beyond the end of the bore in the body part it will during the subsequent upward movement of the tappet and plunger be moved axially by its engagement with the end of the bore, into its correct position. In order to increase the effective pumping stroke of the plunger and thereby enable the apparatus to supply more fuel for a given size, the base circle of the cam can be made smaller. This means that the tappet can move further out of the bore in the body part thereby increasing the risk of the cross pin moving axially. As a result there is much more wear of the ends of the cross pin and the portion of the bore engaged thereby. From the base circle of the cam, the cam has a leading flank which effects inward movement of the plunger and a trailing flank which allows the plunger to move outwardly under the action of the resilient means. There may or may not be a dwell between the leading and trailing flanks.

The object of the present invention is to provide an apparatus of the kind specified in an improved form.

According to the invention in an apparatus of the kind specified the cam is provided with a leading flank extending from the base circle of the cam, the tappet when moved by the leading flank imparting inward movement to the plunger, and a trailing flank which is formed in three parts, a first part extending from the level of the leading flank and during which said port is at least partly open, a second part of substantially constant radius spaced from the base circle by an amount which is sufficient to ensure that the cross pin cannot move axially within the bore in the body part, and a third part extending from said second part to the base circle.

According to a further feature of the invention said third part and said leading flank are tangential to the base circle at a common point.

One example of a liquid fuel pumping apparatus in accordance with the invention will now be described with reference to the accompanying drawing which is a sectional side elevation of the apparatus.

Referring to the drawing the apparatus comprises a body part which is formed in two parts 10, 11. The part 10 constitutes the main part of the body part and it houses a rotary cam 12 which is use, is driven by the associated engine. For this purpose it is carried on a shaft which carries further cams at spaced intervals.

The part 11 of the body part is secured to the upper surface of the part 10 by means of bolts 13 and it provides location of a pump barrel 14 in which is formed a bore 15. Located within the bore is a reciprocable pumping plunger 16 and this extends from one end of the bore and is operatively connected to a tappet generally indicated at 17 and slidable within a bore 18 formed in the part 10 of the body.

The end of the pump barrel remote from the tappet 17 is engaged by a delivery valve housing 19 and this is held in position by means of an end closure 20 within which is formed a fuel outlet 21 in use, connected to a fuel injection nozzle of the associated engine. The delivery valve housing 19 accommodates a delivery valve 22 of known construction, the valve including a spring 23 housed with an enlarged portion of the outlet 21.

The plunger at its lower end is connected to a radially extending arm 24 and the plunger is biassed outwardly by means of a coiled compression spring 25 which at one end engages a spring abutment 26 mounted on the plunger adjacent the arm 24. The other end of the spring bears against a suitable abutment which itself is located within a recess formed in the part 11 of the body.

Formed in the wall of the bore 15 are a pair of ports 27, 28. The ports 27, 28 communicate with a gallery 29 which is defined in the part 11 of the body and which in use, is connected to a source of liquid fuel under pressure. The axis of the port 28 is displaced in the axial direction from that of the port 27, the latter port being nearer to the delivery valve housing 19. Moreover, formed in the wall of the plunger 16 is a helical groove 30 which is in communication with the portion of the bore 15 from which the outlet 21 extends. This communication may be established by an axial groove formed in the plunger or by a passage defined within the plunger. In addition, the plunger is provided with a circumferential groove 31 to collect fuel leaking along the clearance defined between the plunger and the bore 15. The groove communicates with a further groove 32 formed in the surface of the plunger and which extends to a point just short of the inner end of the plunger 16.

The arm 24 is engageable by a fork 33 which is mounted on a control member 34 movable axially within the part 10 of the body. Further forks and further pump assemblies of the kind described above may be mounted in the body so that the apparatus can supply fuel to a multi-cylinder engine.

The tappet assembly comprises a hollow body 35 slidably mounted in the bore 18 and engaging at its upper end with the spring abutment 26. A suitable recess is provided in the body to permit the lever 24 to extend therethrough. The lower end of the plunger is engageable with an abutment 36 which is supported within the body 35.

The tappet also includes a roller 37 engageable with the cam 12 and provided with a bearing sleeve within which is located a cross pin 38.

The operation of the apparatus will now be described starting from the position shown in the drawings. In this position the roller 37 is at its outermost position. The port 27 is completely uncovered by the plunger 16 whilst the port 28 is only partially uncovered. As the plunger is moved upwardly firstly the port 28 will be completely covered followed by the port 27. As soon as the latter port is covered the fuel in the bore 15 between the plunger and the delivery valve will be pressurized and when the pressure of fuel is sufficient, the delivery valve 22 will be lifted to permit flow of fuel through the outlet 21. This flow of fuel will continue until the helical groove 30 uncovers the port 28. As soon as this occurs the pressure in the bore 15 decreases and the remaining fuel flows into the gallery 29 by way of the port 28. As soon as the pressure of fuel decreases, the delivery valve is closed. As the plunger moves outwardly under the action of the spring 25, the port 27 will be uncovered first and fuel will flow into the bore 15 and further fuel may flow through the port 28 when it is uncovered. The angular setting of the plunger which is adjusted by axial movement of the member 34, determines the amount of fuel which is supplied through the outlet at each pumping stroke and clearly the earlier in the stroke that the groove 30 uncovers the port 28, the less will be the amount of fuel supplied through the outlet 21 to the engine.

The part 10 of the body must be machined so as to provide sufficient clearance for the cam 12 to rotate. At the same time however the clearance must not be excessive otherwise an undesirable amount of material will be removed from the part 10 of the body which can provide support for the tappet. In the position shown in the drawing the roller is engaging with the cam at the base circle thereof. The latter is indicated by the circle referenced 39. In this position the cross pin 38 can move axially because it is customary to radius the ends of the pin in order to avoid damage to the bore 18 in the event that the pin moves axially. Even though the pin is radiussed some wear of the bore 18 can take place. If the cam is designed so that the pin does not emerge from the bore 18 then the delivery of the pump will be reduced. The cam is therefore specially designed to permit the maximum stroke whilst at the same time minimising the risk of axial movement of the cross pin.

The cam comprises a leading flank 40 and a trailing flank generally indicated at 41. Between the leading flank and the trailing flank is a dwell portion which means that the plunger will be maintained in its innermost position for a period of time. The trailing flank is formed in three parts; the first part 42 during which the plunger is permitted to move under the action of the spring 25, a second part 43 during which the plunger is maintained at rest at a position such that the port 27 is at least partially uncovered but the cross pin 38 is located within the bore 18, and a third part 44 which extends from the part 43 to the base circle 39 of the cam. Conveniently the leading flank 40 and the part 44 are tangential to the base circle at a common point. The practical effect of this construction is that the pin 38 has only the shortest possible time in which to move axially that is to say whilst the roller is moving along the part 44 of the cam. The pin in fact can only move axially when its longitudinal axis lies beyond the end of the wall of the bore 18. Clearly the height of the part 43 of the cam must be chosen so that the port 27 is open for a sufficient length of time to allow proper filling of the bore 15 whilst at the same time preventing the cross pin 38 and particularly the axis thereof since the pin has radiussed ends, moving out of the bore 18. The dwell period between the leading flank 40 and the trailing flank 41 is optional.

The groove 31 collects fuel leaking between the plunger and the wall of the bore and this fuel is allowed to flow into the port 27 through the groove 32 just prior to the flow of fuel through the port 28 from the groove 30.

I claim:

1. A liquid fuel injection pumping apparatus comprising a body part, a pump barrel located within the body part, a bore formed in the barrel, a reciprocable pump plunger located in the bore and extending from one end thereof, an outlet from the other end of the bore, a port formed in the wall of the bore and which is uncovered by the inner end of the plunger as the latter moves outwardly to allow fuel to flow into the bore, resilient means biassing the plunger outwardly, a tappet operatively connected to the plunger and supported within a bore defined in the body part, said tappet comprising a hollow body, a roller supported in the hollow body by a cross pin, and a rotary cam positioned for engagement with the roller, said cam being shaped to impart inward movement to the tappet and plunger, said cam being provided with a leading flank extending from the base circle of the cam, the tappet when moved by the leading flank imparting inward movement to the plunger, and a trailing flank which is formed in three parts, a first part extending from the level of the leading flank and during which said port is at least partly open, a second part of substantially constant radius spaced from the base circle by an amount which is sufficient to ensure that the cross pin cannot move axially within the bore in the body part, and a third part extending from said second part to the base circle.

2. An apparatus according to claim 1 in which said third part of the trailing flank and said leading flank are tangential to the base circle of the cam at a common point.

* * * * *